(12) United States Patent
Yu et al.

(10) Patent No.: US 12,054,596 B2
(45) Date of Patent: Aug. 6, 2024

(54) AZEOTROPE OR AZEOTROPE-LIKE COMPOSITIONS OF Z-1-CHLORO-2,3,3,3-TETRAFLUOROPROPENE (HCFO-1224YD(Z))

(71) Applicant: Honeywell International Inc., Charlotte, NC (US)

(72) Inventors: Bin Yu, Williamsville, NY (US); Hang T. Pham, Amherst, NY (US)

(73) Assignee: Honeywell International Inc., Charlotte, NC (US)

( * ) Notice: Subject to any disclaimer, the term of this patent is extended or adjusted under 35 U.S.C. 154(b) by 131 days.

(21) Appl. No.: 17/532,510

(22) Filed: Nov. 22, 2021

(65) Prior Publication Data
US 2022/0169816 A1  Jun. 2, 2022

Related U.S. Application Data (60) Provisional application No. 63/166,409, filed on Mar. 26, 2021, provisional application No. 63/119,344, filed on Nov. 30, 2020.

(51) Int. Cl.
*C08J 9/12* (2006.01)
*C08J 9/14* (2006.01)

(52) U.S. Cl.
CPC ............... *C08J 9/127* (2013.01); *C08J 9/125* (2013.01); *C08J 9/144* (2013.01); *C08J 2203/10* (2013.01); *C08J 2203/162* (2013.01); *C08J 2203/182* (2013.01); *C08J 2375/04* (2013.01)

(58) Field of Classification Search
CPC ... C08J 9/125; C08J 9/127; C08J 9/144; C08J 2203/10; C08J 2203/162; C08J 2203/182; C08J 2375/04; C09K 5/04; C09K 5/044
See application file for complete search history.

(56) References Cited

U.S. PATENT DOCUMENTS

| | | | |
|---|---|---|---|
| 7,906,693 B2 | 3/2011 | Nappa et al. | |
| 8,961,808 B2 | 2/2015 | Robin | |
| 9,085,721 B2 | 7/2015 | Robin | |
| 10,138,403 B2 | 11/2018 | Tasaka et al. | |
| 10,370,313 B2 | 8/2019 | Taniguchi et al. | |
| 2017/0218311 A1* | 8/2017 | Tani ..................... | C09K 23/017 |
| 2018/0066170 A1 | 3/2018 | Tasaka et al. | |
| 2018/0264303 A1 | 9/2018 | Robin et al. | |
| 2019/0161661 A1 | 5/2019 | Tasaka et al. | |
| 2019/0218358 A1 | 7/2019 | Creazzo et al. | |
| 2020/0131298 A1 | 4/2020 | Kanzaki | |
| 2020/0148930 A1 | 5/2020 | Fukushima | |
| 2020/0230454 A1 | 7/2020 | Robin et al. | |
| 2020/0231774 A1 | 7/2020 | Singh et al. | |
| 2020/0239755 A1 | 7/2020 | Hayamizu et al. | |
| 2020/0324156 A1 | 10/2020 | Robin et al. | |
| 2020/0325297 A1 | 10/2020 | Kontomaris | |
| 2021/0139441 A1 | 5/2021 | Petrov et al. | |
| 2022/0135759 A1 | 5/2022 | Chinsoga et al. | |
| 2023/0008512 A1 | 1/2023 | De et al. | |

FOREIGN PATENT DOCUMENTS

| | | |
|---|---|---|
| CN | 111263780 A | 6/2020 |
| CN | 112812354 A | 5/2021 |
| CN | 112876727 A | 6/2021 |
| EP | 3992220 A1 | 5/2022 |
| JP | 2015-105340 A | 6/2015 |
| JP | 2015-105341 A | 6/2015 |
| JP | 2015-105342 A | 6/2015 |
| JP | 2015-105343 A | 6/2015 |
| JP | 2016-017131 A | 2/2016 |
| JP | 2018-153463 A | 10/2018 |
| JP | 2020-139006 A | 9/2020 |
| JP | 2020-139007 A | 9/2020 |
| JP | 2020-139137 A | 9/2020 |
| JP | 2020-164854 A | 10/2020 |
| JP | 2021-038313 A | 3/2021 |
| JP | 2021-085019 A | 6/2021 |
| JP | 2021-085020 A | 6/2021 |
| JP | 2021-116317 A | 8/2021 |
| WO | 2012/106565 A2 | 8/2012 |
| WO | 2013/059550 A2 | 4/2013 |
| WO | 2018/175367 A1 | 9/2018 |
| WO | 2019/022139 A1 | 1/2019 |
| WO | 2019/088035 A1 | 5/2019 |
| WO | 2019/104055 A1 | 5/2019 |
| WO | 2020/072725 A1 | 4/2020 |
| WO | 2020/086928 A1 | 4/2020 |
| WO | 2020/196666 A1 | 10/2020 |
| WO | 2021/002097 A1 | 1/2021 |
| WO | 2021/058573 A1 | 4/2021 |

(Continued)

OTHER PUBLICATIONS

International Search Report and Written Opinion received for PCT Patent Application No. PCT/US2021/061191, mailed on Apr. 6, 2022, 9 pages.

*Primary Examiner* — John M Cooney
(74) *Attorney, Agent, or Firm* — Faegre Drinker Biddle & Reath LLP (57) ABSTRACT

Heterogeneous azeotrope or azeotrope-like compositions comprising Z-1-chloro-2,3,3,3-tetrafluoropropene (HCFO-1224yd(Z)) and water which may include from about 47.0 wt. % to about 99.7 wt. % Z-1-chloro-2,3,3,3-tetrafluoropropene (HCFO-1224yd(Z)) and from about 0.3 wt. % to about 53.0 wt. % water and having a boiling point between about 13.0° C. and about 14.0° C. at a pressure of between about 14.0 psia and about 15.0 psia. The azeotrope or azeotrope-like compositions may be used to as blowing agents in the formation of foams.

13 Claims, 1 Drawing Sheet

(56) References Cited

FOREIGN PATENT DOCUMENTS

| WO | 2021/066176 A1 | 4/2021 |
| WO | 2021/145417 A1 | 7/2021 |
| WO | 2021/151900 A1 | 8/2021 |
| WO | 2021/158649 A1 | 8/2021 |
| WO | 2021/165149 A1 | 8/2021 |

* cited by examiner

AZEOTROPE OR AZEOTROPE-LIKE COMPOSITIONS OF Z-1-CHLORO-2,3,3,3-TETRAFLUOROPROPENE (HCFO-1224YD(Z))

CROSS-REFERENCE TO RELATED APPLICATIONS

This application claims priority to U.S. Provisional Application No. 63/199,344, filed Nov. 30, 2020 and U.S. Provisional Application No. 63/166,409, filed Mar. 26, 2021, both of which is herein incorporated by reference in their entireties.

FIELD

The present disclosure pertains to azeotrope or azeotrope-like compositions and, in particular, azeotrope or azeotrope-like compositions comprising effective amounts of Z-1-chloro-2,3,3,3-tetrafluoropropene (HCFO-1224yd(Z)) and water. The present disclosure further provides blowing agent compositions comprising azeotrope or azeotrope-like compositions comprising effective amounts of Z-1-chloro-2,3,3,3-tetrafluoropropene (HCFO-1224yd(Z)) and water, methods for foaming using these compositions, and foams comprising these compositions.

BACKGROUND

Fluorocarbon based fluids have found widespread use in industry in a number of applications, including as refrigerants, aerosol propellants, blowing agents, heat transfer media, gaseous dielectrics, and fire suppression.

The industry is continually seeking new fluorocarbon-based mixtures that offer alternatives, and are considered environmentally safer substitutes for CFCs, HCFCs and HFCs in use today. Of particular interest are mixtures containing hydrofluorocarbons, fluoroolefins, iodide containing compounds and other fluorinated compounds, which have low ozone depletion potentials and low global warming potentials. Such mixtures are the subject of this disclosure.

SUMMARY

The present disclosure provides heterogeneous azeotrope or azeotrope-like compositions of Z-1-chloro-2,3,3,3-tetrafluoropropene (HCFO-1224yd(Z)) and water.

It is well-recognized in the art that it is not possible to predict the formation of azeotropes, and the present inventors have discovered unexpectedly that Z-1-chloro-2,3,3,3-tetrafluoropropene (HCFO-1224yd(Z)) and water form azeotrope or azeotrope-like compositions and, in particular, form heterogeneous azeotrope or azeotrope-like compositions.

The present disclosure provides a composition comprising an azeotrope or azeotrope-like composition comprising, consisting essentially of, or consisting of, effective amounts of Z-1-chloro-2,3,3,3-tetrafluoropropene (HCFO-1224yd (Z)) and water.

The azeotrope or azeotrope-like composition may comprise from about 47.0 wt. % to about 99.7 wt. % Z-1-chloro-2,3,3,3-tetrafluoropropene (HCFO-1224yd(Z)) and from about 0.3 wt. % to about 53.0 wt. % water, or from about 70.0 wt. % to about 99.0 wt. % Z-1-chloro-2,3,3,3-tetrafluoropropene (HCFO-1224yd(Z)) and from about 1.0 wt. % to about 30.0 wt. % water, or from about 75.0 wt. % to about 98.5 wt. % Z-1-chloro-2,3,3,3-tetrafluoropropene (HCFO-1224yd(Z)) and from about 1.5 wt. % to about 25.0 wt. % water. The azeotrope or azeotrope-like composition may consist essentially of Z-1-chloro-2,3,3,3-tetrafluoropropene (HCFO-1224yd(Z)) and water in the above amounts or consist of Z-1-chloro-2,3,3,3-tetrafluoropropene (HCFO-1224yd(Z)) and water in the above amounts.

Alternatively, the azeotrope or azeotrope-like composition may comprise from about 75.0 wt. % to about 99.0 wt. % Z-1-chloro-2,3,3,3-tetrafluoropropene (HCFO-1224yd (Z)) and from about 1.0 wt. % to about 25.0 wt. % water, or from about 80.0 wt. % to about 99.0 wt. % Z-1-chloro-2,3,3,3-tetrafluoropropene (HCFO-1224yd(Z)) and from about 1.0 wt. % to about 20.0 wt. % water, or from about 85.0 wt. % to about 99.0 wt. % Z-1-chloro-2,3,3,3-tetrafluoropropene (HCFO-1224yd(Z)) and from about 1.0 wt. % to about 15.0 wt. % water, or from about 90.0 wt. % to about 99.0 wt. % Z-1-chloro-2,3,3,3-tetrafluoropropene (HCFO-1224yd(Z)) and from about 1.0 wt. % to about 10.0 wt. % water, or from about 95.0 wt. % to about 99.0 wt. % Z-1-chloro-2,3,3,3-tetrafluoropropene (HCFO-1224yd(Z)) and from about 1.0 wt. % to about 5.0 wt. % water. The azeotrope or azeotrope-like composition may consist essentially of Z-1-chloro-2,3,3,3-tetrafluoropropene (HCFO-1224yd(Z)) and water in the above amounts or consist of Z-1-chloro-2,3,3,3-tetrafluoropropene (HCFO-1224yd(Z)) and water in the above amounts.

The azeotrope of azeotrope-like composition has a boiling point between about 13.0° C. and about 14.0° C. at a pressure of between about 14 psia and about 15 psia.

In a further form thereof, the present disclosure provides a method of forming an azeotrope or azeotrope-like composition comprising the step of combining Z-1-chloro-2,3,3,3-tetrafluoropropene (HCFO-1224yd(Z)) and water to form an azeotrope or azeotrope-like composition comprising, consisting essentially of, or consisting of Z-1-chloro-2,3,3,3-tetrafluoropropene (HCFO-1224yd(Z)) and water. The azeotrope of azeotrope-like composition may have a boiling point between about 13.0° C. and about 14.0° C. at a pressure of between about 14 psia and about 15 psia.

In the foregoing methods, the step of modifying the relative amounts of Z-1-chloro-2,3,3,3-tetrafluoropropene (HCFO-1224yd(Z)) and water may involve adding Z-1-chloro-2,3,3,3-tetrafluoropropene (HCFO-1224yd(Z)) to the composition, adding water to the composition, or adding both Z-1-chloro-2,3,3,3-tetrafluoropropene (HCFO-1224yd (Z)) and water to the composition.

The present disclosure further provides uses for the azeotrope or azeotrope-like composition. Specifically, the present disclosure provides for the use of the azeotrope or azeotrope-like composition as a blowing agent.

The blowing agent may comprise the azeotrope or azeotrope-like composition of Z-1-chloro-2,3,3,3-tetrafluoropropene (HCFO-1224yd(Z)) and water in amounts of from about 47.0 wt. % to about 99.7 wt. % Z-1-chloro-2,3,3,3-tetrafluoropropene (HCFO-1224yd(Z)) and from about 0.3 wt. % to about 53.0 wt. % water, about 70.0 wt. % to about 99.0 wt. % Z-1-chloro-2,3,3,3-tetrafluoropropene (HCFO-1224yd(Z)) and from about 1.0 wt. % to about 30.0 wt. % water, or from about 75.0 wt. % to about 98.5 wt. % Z-1-chloro-2,3,3,3-tetrafluoropropene (HCFO-1224yd(Z)) and from about 1.5 wt. % to about 25.0 wt. % water.

Alternatively, blowing agent may comprise the azeotrope or azeotrope-like composition in amounts of from about 75.0 wt. % to about 99.0 wt. % Z-1-chloro-2,3,3,3-tetrafluoropropene (HCFO-1224yd(Z)) and from about 1.0 wt. % to about 25.0 wt. % water, or from about 80.0 wt. % to about 99.0 wt. % Z-1-chloro-2,3,3,3-tetrafluoropropene (HCFO- 1224yd(Z)) and from about 1.0 wt. % to about 20.0 wt. % water, or from about 85.0 wt. % to about 99.0 wt. % Z-1-chloro-2,3,3,3-tetrafluoropropene (HCFO-1224yd(Z)) and from about 1.0 wt. % to about 15.0 wt. % water, or from about 90.0 wt. % to about 99.0 wt. % Z-1-chloro-2,3,3,3-tetrafluoropropene (HCFO-1224yd(Z)) and from about 1.0 wt. % to about 10.0 wt. % water, or from about 95.0 wt. % to about 99.0 wt. % Z-1-chloro-2,3,3,3-tetrafluoropropene (HCFO-1224yd(Z)) and from about 1.0 wt. % to about 5.0 wt. % water. The azeotrope or azeotrope-like composition may consist essentially of Z-1-chloro-2,3,3,3-tetrafluoropropene (HCFO-1224yd(Z)) and water in the above amounts or consist of Z-1-chloro-2,3,3,3-tetrafluoropropene (HCFO-1224yd(Z)) and water in the above amounts.

DETAILED DESCRIPTION

The present disclosure provides azeotrope or azeotrope-like compositions comprising Z-1-chloro-2,3,3,3-tetrafluoropropene (HCFO-1224yd(Z)) and water, described in further detail below. The present disclosure also provides compositions, and particularly blowing agents, foamable compositions, foamed articles and methods and systems for forming foam, which utilize the azeotrope or azeotrope-like compositions of Z-1-chloro-2,3,3,3-tetrafluoropropene (HCFO-1224yd(Z)) and water.

I. Azeotrope or Azeotrope-Like Compositions

It has been found that Z-1-chloro-2,3,3,3-tetrafluoropropene (HCFO-1224yd(Z)) forms heterogeneous azeotropic and azeotrope-like mixtures with water, and the present disclosure provides heterogeneous azeotropic or azeotrope-like compositions comprising Z-1-chloro-2,3,3,3-tetrafluoropropene (HCFO-1224yd(Z)) and water. The composition may consist essentially of Z-1-chloro-2,3,3,3-tetrafluoropropene (HCFO-1224yd(Z)) and water or the composition may consist of Z-1-chloro-2,3,3,3-tetrafluoropropene (HCFO-1224yd(Z)) and water.

The present inventors have found experimentally that Z-1-chloro-2,3,3,3-tetrafluoropropene (HCFO-1224yd(Z)) and water form a heterogeneous azeotropic or azeotrope-like composition.

An "azeotrope" (or "azeotropic") composition is a unique combination of two or more components. An azeotrope can be either homogenous (which has one liquid phase) or heterogeneous (which has two liquid phases). An azeotrope composition can be characterized in various ways. For example, at a given pressure, an azeotrope composition boils at a constant characteristic temperature which is either greater than the higher boiling point component (maximum boiling azeotrope) or less than the lower boiling point component (minimum boiling azeotrope). However, in the case of a heterogeneous azeotrope the boiling point of the azeotrope will always be below the boiling point of the lower boiling point component. In the case of a heterogeneous azeotrope then at this characteristic temperature the composition of each of the two liquid phases and the vapor phase will remain constant upon boiling. The azeotrope composition does not fractionate upon boiling or evaporation. Therefore, the components of the azeotrope composition cannot be separated during a phase change.

A heterogeneous azeotrope consists of two liquid phases and one vapor phase, or one solid, one liquid, and one vapor phase, all in equilibrium. For a heterogeneous azeotrope at a given temperature and pressure, the composition of each of the two liquid phases and the composition of the vapor phase remain constant. If a heterogeneous azeotrope is formed, at a constant pressure the boiling point of the heterogeneous azeotrope will be less than the lower boiling point component (a "minimum boiling azeotrope").

An azeotrope composition is also characterized in that at the characteristic azeotrope temperature, the bubble point pressure of the liquid phase is identical to the dew point pressure of the vapor phase.

The behavior of an azeotrope composition is in contrast with that of a non-azeotrope composition in which during boiling or evaporation, the liquid composition changes to a substantial degree.

For the purposes of the present disclosure, an azeotrope composition is characterized as that composition which boils at a constant characteristic temperature, the temperature being lower (a minimum boiling azeotrope) than the boiling points of the two or more components, and thereby having the same composition in both the vapor and liquid phases.

One of ordinary skill in the art would understand however that at different pressures, both the composition and the boiling point of the azeotrope composition will vary to some extent. Therefore, depending on the temperature and/or pressure, an azeotrope composition can have a variable composition. The skilled person would therefore understand that composition ranges, rather than fixed compositions, can be used to define azeotrope compositions. In addition, an azeotrope may be defined in terms of exact weight percentages of each component of the compositions characterized by a fixed boiling point at a specified pressure.

Azeotrope or azeotrope-like compositions can be identified using a number of different methods.

For the purposes of this disclosure the azeotrope or azeotrope-like composition is identified experimentally using an ebulliometer (Walas, Phase Equilibria in Chemical Engineering, Butterworth-Heinemann, 1985, 533-544). An ebulliometer is designed to provide extremely accurate measurements of the boiling points of liquids by measuring the temperature of the vapor-liquid equilibrium.

The boiling points of each of the components alone are measured at a constant pressure. As the skilled person will appreciate, for a binary azeotrope or azeotrope-like composition, the boiling point of one of the components of the composition is initially measured. The second component of the composition is then added in varying amounts and the boiling point of each of the obtained compositions is measured using the ebulliometer at said constant pressure. In the case of a ternary azeotrope the initial composition would comprise of a binary blend and a third component is added in varying amounts. The boiling point of each of the obtained ternary compositions is measured using the ebulliometer at said constant pressure.

The measured boiling points are plotted against the composition of the tested composition, for example, for a binary azeotrope, the amount of the second component added to the composition, (expressed as either weight % or mole %). The presence of an azeotrope composition can be identified by the observation of a maximum or minimum boiling temperature which is greater or less than the boiling points of any of the components alone.

As the skilled person will appreciate, the identification of the azeotrope or azeotrope-like composition is made by the comparison of the change in the boiling point of the composition on addition of the second component to the first component, relative to the boiling point of the first component. Thus, it is not necessary that the system be calibrated to the reported boiling point of the particular components in order to measure the change in boiling point.

As previously discussed, at the maximum or minimum boiling point, the composition of the vapor phase will be identical to the composition of the liquid phases. The azeotrope-like composition is therefore that composition of components which provides a substantially constant minimum or maximum boiling point, that is a boiling point between about 13.0° C. and about 14.0° C. at a pressure of between about 14.0 psia and about 15.0 psia, at which substantially constant boiling point the composition of the vapor phase will be substantially identical to the composition of the liquid phases.

The present disclosure provides an azeotrope or azeotrope-like composition which comprises effective amounts Z-1-chloro-2,3,3,3-tetrafluoropropene (HCFO-1224yd(Z)) and water to form an azeotrope or azeotrope-like composition. As used herein, the term "effective amount" is an amount of each component which, when combined with the other component, results in the formation of an azeotrope or azeotrope-like mixture.

The present azeotrope or azeotrope-like compositions may consist essentially of combinations of amounts Z-1-chloro-2,3,3,3-tetrafluoropropene (HCFO-1224yd(Z)) and water or consist of combinations of amounts Z-1-chloro-2,3,3,3-tetrafluoropropene (HCFO-1224yd(Z)) and water.

As used herein, the term "consisting essentially of", with respect to the components of an azeotrope or azeotrope-like composition or mixture, means the composition contains the indicated components in an azeotrope or azeotrope-like ratio, and may contain additional components provided that the additional components do not form new azeotrope or azeotrope-like systems. For example, azeotrope mixtures consisting essentially of two compounds are those that form binary azeotropes, which optionally may include one or more additional components, provided that the additional components do not render the mixture non-azeotropic and do not form an azeotrope with either or both of the compounds (e.g., do not form a ternary or higher azeotrope).

The present disclosure also provides a method of forming an azeotrope or azeotrope-like composition by mixing, combining, or blending, effective amounts of Z-1-chloro-2,3,3,3-tetrafluoropropene (HCFO-1224yd(Z)) and water. Any of a wide variety of methods known in the art for combining two or more components to form a composition can be used in the present methods. For example, Z-1-chloro-2,3,3,3-tetrafluoropropene (HCFO-1224yd(Z)) and water can be mixed, blended, or otherwise combined by hand and/or by machine, as part of a batch or continuous reaction and/or process, or via combinations of two or more such steps. The components can be provided in the required amounts, for example by weighing and then combining the amounts.

The azeotrope or azeotrope-like composition has a boiling point between about 13.0° C. and about 14.0° C. at a pressure of between about 14.0 psia and about 15.0 psia, and comprises, consists essentially of, or consists of, from about 47.0 wt. % to about 99.7 wt. % Z-1-chloro-2,3,3,3-tetrafluoropropene (HCFO-1224yd(Z)) and from about 0.3 wt. % to about 53.0 wt. % water from about 70.0 wt. % to about 99.0 wt. % Z-1-chloro-2,3,3,3-tetrafluoropropene (HCFO-1224yd(Z)) and from about 1.0 wt. % to about 30.0 wt. % water, from about 75.0 wt. % to about 98.5 wt. % Z-1-chloro-2,3,3,3-tetrafluoropropene (HCFO-1224yd(Z)) and from about 1.5 wt. % to about 25.0 wt. % water.

Alternatively, the azeotrope or azeotrope-like composition may comprise, consist essentially of, or consist of, from about 75.0 wt. % to about 99.0 wt. % Z-1-chloro-2,3,3,3-tetrafluoropropene (HCFO-1224yd(Z)) and from about 1.0 wt. % to about 25.0 wt. % water, or from about 80.0 wt. % to about 99.0 wt. % Z-1-chloro-2,3,3,3-tetrafluoropropene (HCFO-1224yd(Z)) and from about 1.0 wt. % to about 20.0 wt. % water, or from about 85.0 wt. % to about 99.0 wt. % Z-1-chloro-2,3,3,3-tetrafluoropropene (HCFO-1224yd(Z)) and from about 1.0 wt. % to about 15.0 wt. % water, or from about 90.0 wt. % to about 99.0 wt. % Z-1-chloro-2,3,3,3-tetrafluoropropene (HCFO-1224yd(Z)) and from about 1.0 wt. % to about 10.0 wt. % water, or from about 95.0 wt. % to about 99.0 wt. % Z-1-chloro-2,3,3,3-tetrafluoropropene (HCFO-1224yd(Z)) and from about 1.0 wt. % to about 5.0 wt. % water. The azeotrope or azeotrope-like composition may consist essentially of Z-1-chloro-2,3,3,3-tetrafluoropropene (HCFO-1224yd(Z)) and water in the above amounts or consist of Z-1-chloro-2,3,3,3-tetrafluoropropene (HCFO-1224yd(Z)) and water in the above amounts.

The azeotrope or azeotrope-like composition comprising, consisting essentially of, or consisting of effective amounts of Z-1-chloro-2,3,3,3-tetrafluoropropene (HCFO-1224yd(Z)) and water disclosed herein may be used for separating impurities from Z-1-chloro-2,3,3,3-tetrafluoropropene (HCFO-1224yd(Z)). Such impurities may include E-1-chloro-2,3,3,3-tetrafluoropropene (HCFO-1224yd(E)), 1,1-dichloro-2,3,3,3-tetrafluoropropene (HFO-1214ya), and 2,3,3,3-tetrafluoropropene (HFO-1234yf), among others.

The preparation of azeotropic or azeotrope-like compositions comprising, consisting essentially of, or consisting of effective amounts of Z-1-chloro-2,3,3,3-tetrafluoropropene (HCFO-1224yd(Z)) and water allows separation techniques such as azeotropic distillation, phase separation, or fractionation, for example, to be used to remove impurities from Z-1-chloro-2,3,3,3-tetrafluoropropene (HCFO-1224yd(Z)).

In particular, an azeotrope or azeotrope-like composition comprising, consisting essentially of, or consisting of effective amounts of Z-1-chloro-2,3,3,3-tetrafluoropropene (HCFO-1224yd(Z)) and water may be formed from a composition including Z-1-chloro-2,3,3,3-tetrafluoropropene (HCFO-1224yd(Z)), water, and at least one impurity. For example, Z-1-chloro-2,3,3,3-tetrafluoropropene (HCFO-1224yd(Z)), water, or both, may be added to the composition to form the azeotrope or azeotrope-like composition. Following the formation of the azeotrope or azeotrope-like composition, the azeotrope or azeotrope-like composition may be separated from the other chemical compounds by a suitable method, such as by distillation, phase separation, or fractionation.

In one example, the present disclosure provides a method of separating impurities from Z-1-chloro-2,3,3,3-tetrafluoropropene (HCFO-1224yd(Z)), comprising the steps of providing a composition of crude Z-1-chloro-2,3,3,3-tetrafluoropropene (HCFO-1224yd(Z)) and water, modifying the relative amounts of Z-1-chloro-2,3,3,3-tetrafluoropropene (HCFO-1224yd(Z)) and water, and subjecting the composition to conditions effective to form an azeotrope or azeotrope-like composition consisting essentially of, or consisting of, effective amounts of Z-1-chloro-2,3,3,3-tetrafluoropropene (HCFO-1224yd(Z)) and water, and separating the azeotrope or azeotrope-like composition from the at least one impurity by a separation technique such as phase separation, distillation, or fractionation, for example.

The step of modifying the relative amounts of Z-1-chloro-2,3,3,3-tetrafluoropropene (HCFO-1224yd(Z)) and water may involve adding Z-1-chloro-2,3,3,3-tetrafluoropropene (HCFO-1224yd(Z)) to the composition, adding water to the composition, or adding both Z-1-chloro-2,3,3,3-tetrafluoropropene (HCFO-1224yd(Z)) and water to the composition.

In another example, the present disclosure provides a method of separating impurities from Z-1-chloro-2,3,3,3-tetrafluoropropene (HCFO-1224yd(Z)), comprising the steps of providing a composition of crude Z-1-chloro-2,3,3,3-tetrafluoropropene (HCFO-1224yd(Z)), adding an effective amount of water to the composition, modifying the relative amounts of Z-1-chloro-2,3,3,3-tetrafluoropropene (HCFO-1224yd(Z)) and water, and subjecting the composition to conditions effective to form an azeotrope or azeotrope-like composition consisting essentially of, or consisting of, effective amounts of Z-1-chloro-2,3,3,3-tetrafluoropropene (HCFO-1224yd(Z)) and water, and separating the azeotrope or azeotrope-like composition from the at least one impurity by a separation technique such as phase separation, distillation, or fractionation, for example. The step of modifying the relative amounts of Z-1-chloro-2,3,3,3-tetrafluoropropene (HCFO-1224yd(Z)) and water may involve adding Z-1-chloro-2,3,3,3-tetrafluoropropene (HCFO-1224yd(Z)) to the composition, adding water to the composition, or adding both Z-1-chloro-2,3,3,3-tetrafluoropropene (HCFO-1224yd(Z)) and water to the composition.

II. Blowing Agents Comprising the Azeotrope or Azeotrope-Like Composition

Fluorocarbon fluids have properties that are desirable for use in a variety of applications, including as blowing agents, and other applications. Unfortunately, the use of certain hydrofluorocarbons "HFCs" in industrial applications is now believed to contribute to the global warming, and accordingly, have limited their contemporary use. However, the identification of new, environmentally-safe compositions comprising HFCs is complicated, due to the fact that many properties which make them useful in these applications are not readily predictable. For example, it is desirable that blowing agent compositions not only have acceptable environmental properties, but also chemical stability, low- or no-toxicity, low or no-flammability, among others. It is also desirable that the blowing agent has excellent performance when in use, e.g. excellent thermal insulating properties and other desirable foam characteristics.

Methods and compositions for making conventional foamed materials, such as for example thermoplastic materials and thermosetting materials, have long been known. These methods and compositions have typically utilized chemical and/or physical blowing agents to form the foamed structure in a polymeric matrix. Such blowing agents have included, for example, azo compounds, various volatile organic compounds (VOCs) and chlorofluorocarbons (CFCs). The chemical blowing agents typically undergo some form of chemical change, including chemical reaction with the material that forms the polymer matrix (usually at a predetermined temperature/pressure) that causes the release of a gas, such as nitrogen, carbon dioxide, or carbon monoxide. One of the most frequently used chemical blowing agents is water. The physical blowing agents typically are dissolved in the polymer or polymer precursor material and then expand volumetrically (again at a predetermined temperature/pressure) to contribute to the formation of the foamed structure. Physical blowing agents are frequently used in connection with thermoplastic foams, although chemical blowing agents can be used in place of or in addition to physical blowing agents in connection with thermoplastic foam. It is common to use chemical blowing and/or physical blowing agents in connection with thermosetting foams. Of course, it is possible that certain compounds and the compositions that contain them may at once constitute a chemical and a physical blowing agent.

The blowing agent may comprise the azeotrope or azeotrope-like composition of Z-1-chloro-2,3,3,3-tetrafluoropropene (HCFO-1224yd(Z)) and water in an amount of at least about 5% by weight, preferably at least about 10% by weight, more preferably at least about 15% by weight, more preferably at least about 20% by weight, more preferably at least about 25% by weight, more preferably at least about 30% by weight of the blowing agent composition, more preferably at least about 40% by weight, more preferably at least about 50% by weight.

Alternatively, the blowing agent may consist essentially of the azeotrope or azeotrope-like composition of Z-1-chloro-2,3,3,3-tetrafluoropropene (HCFO-1224yd(Z)) and water. Alternatively, the blowing agent may consist of the azeotrope or azeotrope-like composition of Z-1-chloro-2,3,3,3-tetrafluoropropene (HCFO-1224yd(Z)) and water.

When used as a blowing agent, the azeotrope or azeotrope-like composition of Z-1-chloro-2,3,3,3-tetrafluoropropene (HCFO-1224yd(Z)) and water may be used in combination with one or more additional blowing agents, such as one or more of 1,1-difluoroethane (HFC-152a), 1,1,1,3,3-pentafluoropropane (HFC-245fa), 1,1,1,2-tetrafluoroethane (HFC-134a), 1,1,2,2,-tetrafluoroethane (HFC-134), 1,1,1,3,3-pentafluorobutane (HFC-365mfc), propane, butane, pentane, cyclopentane, hexane, E-1,3,3,3-tetrafluoropropene (HFO-1234ze(E)), 2,3,3,3-tetrafluoropropene (HFO-1234yf), E-1,1,1,4,4,4-hexafluoro-2-butene (HFO-1336mzz (E)), Z-1,1,1,4,4,4-hexafluoro-2-butene (HFO-1336mzz (Z)), E-1-chloro-3,3,3-trifluoropropene (HFO-1233zd(E)), Z-1-chloro-3,3,3-trifluoropropene (HFO-1233zd(Z)), E-1-chloro-2,3,3,3-tetrafluoropentene (HCFO-1224yd(E)), 1,1-dichloro-2,3,3,3-tetrafluoropropene (HFO-1214ya), trans-dichloroethylene (trans-DCE), methyl formate, methylal, formic acid, acetic acid, C1-C4 aldehydes, C3-C4 ketones, C2-C4 ethers, diethers, and combinations thereof.

III. Foamable Compositions Comprising the Azeotrope or Azeotrope-Like Composition The present disclosure provides foamable compositions including a blowing agent composition such as those described above, and one or more components capable of forming foam. Specifically, the azeotrope-like composition is well suited for polyurethane and polyisocyanurate foam compositions. In principle, the azeotrope or azeotrope-like composition is added to a foamable composition, which may contain other components needed to react to make foam under specific reaction conditions.

As used herein, the term "foam forming agent" is used to refer to a component, or a combination of components, which are capable of forming a foam structure, preferably a generally cellular foam structure, not including additives such as flame retardants, surfactants, crossslinkers, de-frothing agents, solubility enhancer, fillers, dispersing agents, antibacterial agents, viscosity reduction modifiers, vapor pressure modifiers, colorants, and dyes, for example.

The one or more components capable of forming foam may be a composition capable of forming a thermosetting foam. Examples of thermosetting foams may include polyurethane and polyisocyanurate foam.

The present disclosure also relates to a closed cell foam comprising the blowing agent composition of the disclosure. The foam may be a rigid foam, a flexible foam, or an integral skin foam. Preferably, the disclosure relates to a closed cell rigid foam comprising the blowing agent composition comprising the azeotrope or azeotrope-like composition of Z-1-chloro-2,3,3,3-tetrafluoropropene (HCFO-1224yd(Z)) and water described above.

The foam provided by the present disclosure can be a block, a slab, a laminate, a panel, such as a pour-in-place panel, a spray applied foam, a froth, and the like. The foams described in the present disclosure, particularly thermoset foams disclosed herein, may be used in a wide variety of applications, in certain preferred embodiments the present disclosure comprises appliance foams in accordance with the present disclosure, including refrigerator foams, freezer foams, refrigerator/freezer foams, panel foams, and other cold or cryogenic manufacturing applications.

The foams of the present disclosure are particularly provided for use in appliance, refrigeration, transportation and building industries (for example as building envelopes). The foams described herein provide one or more exceptional features, characteristics and/or properties, including: thermal insulation efficiency (particularly for thermoset foams), dimensional stability, compressive strength, aging of thermal insulation properties, and flame retardancy, among others, all in addition to the low global warming potential associated with the blowing agents of the present disclosure.

Preferably the foams (and particularly the thermoset foams) of the present disclosure exhibit an initial K-factor (BTU in/hr ft$^{2\circ}$ F.) at 50° F. of not greater than about 0.20, more preferably not greater than 0.18, and even more preferably not greater than 0.16.

The foam may be a thermoset foam or a thermoplastic foam. The thermoplastic foam is preferably polyethylene (PE), polypropylene (PP), polystyrene (PS) or polyethyleneterepthalate (PET). Preferably, the thermoplastic foam is an extruded thermoplastic foam. More particularly the foam is an extruded polystyrene foam.

The thermoset foam is preferably a polyisocyanurate or polyurethane foam.

IV. Method of Forming Foams

It is contemplated that all presently known and available methods and systems for forming foam are readily adaptable for use in connection with the compositions of the present disclosure. For example, the methods of the present disclosure generally incorporate a blowing agent into a foamable composition and then foaming the composition, preferably by a step or series of steps which include causing volumetric expansion of the blowing agent described herein. In general, it is contemplated that the presently used systems and devices for incorporation of blowing agent and for foaming can readily be used in accordance with the compositions of the present disclosure. In fact, it is believed that one advantage of the present disclosure is the provision of an improved blowing agent which is generally compatible with existing foaming methods and systems.

Thus, it will be appreciated by those skilled in the art that the present disclosure comprises methods and systems for foaming all types of foams, including thermosetting foams, and thermoplastic foams. Thus, the present disclosure relates to the use of the present blowing agents in connection with conventional foaming equipment at conventional processing conditions. The present methods therefore include master-batch type operations, blending type operations, third stream blowing agent addition, and blowing agent addition at the mixing head.

With respect to thermoplastic foams, the preferred methods generally comprise introducing a blowing agent into a thermoplastic material, preferably a thermoplastic polymer, and then subjecting the thermoplastic material to conditions effective to cause foaming.

For example, the step of introducing the blowing agent into the thermoplastic material may comprise introducing the blowing agent into an extruder (e.g. a screw extruder) containing the thermoplastic, and the step of causing foaming may comprise lowering the pressure on the thermoplastic material and thereby causing expansion of the blowing agent and contributing to the foaming of the material.

It will be appreciated by those skilled in the art, especially in view of the disclosure contained herein, that the order and manner in which the blowing agent of the present disclosure is formed and/or added to the foamable composition does not generally affect the operability of the present disclosure. For example, in the case of extrudable foams, it is possible that the various components of the blowing agent, and even the components of the foamable composition, are not mixed in advance of introduction to the extrusion equipment, or even that the components are not added to the same location in the extrusion equipment. Moreover, the blowing agent can be introduced either directly or as part of a premix, which is then further added to other parts of the foamable composition.

Thus, it may be desirable to introduce one or more components of the blowing agent at first location in the extruder, which is upstream of the place of addition of one or more other components of the blowing agent, with the expectation that the components will come together in the extruder and/or operate more effectively in this manner. Nevertheless, it may be preferred that two or more components of the blowing agent are combined in advance and introduced together into the foamable composition, either directly or as part of premix which is then further added to other parts of the foamable composition.

The present disclosure also relates to methods of forming thermoset foams, such as polyurethane or polyisocyanurate. The methods generally comprise providing a blowing agent composition of the present disclosure, adding (directly or indirectly) the blowing agent composition to a foamable composition, and reacting the foamable composition under the conditions effective to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, NY, which is incorporated herein by reference, may be used in accordance with the present disclosure. In general, such preferred methods comprise preparing thermoset (e.g. polyurethane, or polyisocyanurate foams) by combining an isocyanate, a polyol or mixture of polyols, a blowing agent composition of the present disclosure, and optionally other materials such as catalysts, surfactants, flame retardants, colorants, or other additives.

It is convenient to provide the components for polyurethane or polyisocyanurate foams in pre-blended formulations. Most typically, the pre-blended formulation is pre-blended into two components. The isocyanate and optionally certain surfactants comprise the first component, commonly referred to as the "A" component. The polyol or polyol mixture, surfactants, catalysts, flame retardants comprise the second component, commonly referred to as the "B" component. The blowing agent composition may be present in the A component and/or the B component. For example, if the blowing agent composition comprises two blowing agents, the first blowing agent may be present in the A component, and the second blowing agent may be present in the B component.

The azeotrope or azeotrope-like mixture of Z-1-chloro-2,3,3,3-tetrafluoropropene (HCFO-1224yd(Z)) and water may be present in the polyol preblend mixture (B component) in an amount of about 2 wt. % to about 40 wt. %, about 3 wt. % to about 35 wt. %, or about 4 wt. % to about 30 wt. % as a percentage of the total polyol preblend resin (B component). Preferably, the azeotrope or azeotrope-like mixture of Z-1-chloro-2,3,3,3-tetrafluoropropene (HCFO-1224yd(Z)) and water may be present in the polyol preblend mixture (B component) in an amount of about 4 wt. % to about 30 wt. %.

The polyol preblend mixture of the present disclosure may include additional components. Such optional additional compounds include, but are not limited to, optionally other blowing agent such as E-1-chloro-2,3,3,3-tetrafluoropropene (HCFO-1224yd(E), Z-1,1,1,4,4,4-hexafluoro-2-butene (HFO-1336mzz(Z)), E-1,1,1,4,4,4-hexafluoro-2-butene (HFO-1336mzz(E), E-1-chloro-3,3,3-trifluoropropene (HFO-1233zd(E), 1,1-dichloro-2,3,3,3-tetrafluoropropene (HFO-1214ya), E-1,3,3,3-tetrafluoropropene (1234ze(E), 2,3,3,3-tetrafluoropropene (HFO-1234yf), and 1,1-dichloro-2,2,-difluoroethylene (HFO-1112); hydrocarbons such as iso-pentane, n-pentane, and cyclopentane; hydrofluorocarbons such as 1,1,1,3,3-pentafluoropropane (HFC-245fa) and 1,1,1,3,3-pentafluorobutane (HFC-365mfc); organic acids such as formic acid and acetic acid); various polyols; catalysts such as amine catalysts or metal catalysts; flame retardants such as organic flame retardants and/or inorganic flame retardants; surfactants (silicon or non-silicone); crossslinkers; de-frothing agents; solubility enhancers; fillers; dispersing agents; antibacterial agents; viscosity reduction modifiers; vapor pressure modifiers; colorants; and dyes.

Suitable polyols may include sucrose containing polyols; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; one or more of (a) condensed with one or more of (b), wherein (a) is selected from glycerine, ethylene glycol, diethylene glycol, trimethylolpropane, ethylene diamine, pentaerythritol, soy oil, lecithin, tall oil, palm oil, and castor oil; and (b) is selected from ethylene oxide, propylene oxide, a mixture of ethylene oxide and propylene oxide; and combinations thereof, for example.

Suitable catalysts may include amine catalysts and/or metal catalysts. Amine catalysts may include, but are not limited to, primary amine, secondary amine or tertiary amine. Useful tertiary amine catalysts non-exclusively include N,N-dimethylcyclohexylamine, N,N-dimethylethanolamine, dimethylaminoethoxyethanol, N,N,N'-trimethylaminoethyl-ethanolamine, N,N,N'-trimethyl-N'-hydroxyethylbisaminoethylether, tetramethyliminobispropylamine, 2-[[2-[2-(dimethylamino)ethoxy]ethyl]methylamino]ethanol, pentamethyldiethylenetriamine, pentamethyldipropylenetriamine, N,N,N',N", N"-pentamethyldipropylenetriamine, 1,1,4,7,10,10-hexamethyltriethylenetetramine, N,N-bis(3-dimethylaminopropyl)-N-isopropanolamine, N'-(3-(dimethylamino) propyl)-N,N-dimethyl-1,3-propanediamine, bis(3-dimethylaminopropyl)-n,n-dimethylpropanediamine, bis-(2-dimethylaminoethyl) ether, N,N',N"-dimethylaminopropylhexahydrotriazine, tetramethyliminobispropylamine, trimethyl-n',2-hydroxyethyl-propylenediamine, Bis-(3-aminopropyl)-methylamine, N,N-dimethyl-1,3-propanediamine, 1-(dimethylamino) hexadecane, benzyldimethylamine, 3-dimethylaminopropyl urea, dicyclohexylmethylamine; ethyldiisopropylamine; dimethylisopropylamine; methylisopropylbenzylamine; methylcyclopentylbenzylamine; isopropyl-sec-butyl-trifluoroethylamine; diethyl-(α-phenylethyl)amine, tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl)amine; or combinations thereof, for example.

Suitable isocyanates may include any organic polyisocyanurate which can be employed in polyurethane or polyisocyanurate foam synthesis inclusive of aliphatic and aromatic polyisocyanurate. Suitable organic polyisocyanurates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124.605; and 3,201,372.

Certain surfactants are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458, each of which is incorporated herein by reference. Other optional additives for the polyol pre-blend may include flame retardants such as tri(2-chloroethyl)phosphate, tri(2-chloropropyl)phosphate, tri(2,3-dibromopropyl)-phosphate, tri(1,3-dichloropropyl) phosphate, ammonium polyphosphate, various halogenated aromatic compounds, antimony oxide, aluminum trihydrate, polyvinyl chloride, and the like.

The polyurethane or polyisocyanurate foams are readily prepared by bringing together the A and B side components by mixing to form a foam, for example blocks, slabs, laminates, pour-in-place panels and other items, spray applied foams, froths, and the like. The mixing may be by hand mix e.g. for small preparations or machine mixing techniques.

The present methods and systems also include forming a one component thermoset foam, preferably polyurethane foam, containing a blowing agent in accordance with the present disclosure. A portion of the blowing agent may be contained in the foam forming agent of the one component foam, preferably by being dissolved in the foam forming agent which is liquid at the pressure within the container, and a second portion of the blowing agent may be present as a separate gas phase. In such systems, the contained/dissolved blowing agent performs, in large part, to cause the expansion of the foam, and the separate gas phase operates to impart propulsive force to the foam forming agent. Such one component systems are typically and preferably packaged in a container, such as an aerosol type can, and the blowing agent of the present disclosure thus preferably provides for expansion of the foam and/or the energy to transport the foam/foamable material from the package, and preferably both. Such systems and methods may comprise charging the package with a fully formulated system (preferably isocyanate/polyol system) and incorporating a gaseous blowing agent in accordance with the present disclosure into the package, preferably an aerosol type can.

Any of the methods well known in the art, such as those described in "Polyurethanes Chemistry and Technology," Volumes I and II, Saunders and Frisch, 1962, John Wiley and Sons, New York, NY, which is incorporated herein by reference, may be used or adapted for use in accordance with the foam forming embodiments of the present disclosure.

The following non-limiting example serves to illustrate the disclosure.

EXAMPLES

All foams (polyisocyanurate (PIR) and polyurethane (PU)) were formulated using the following starting materials: Stepanpol PS 2352, available from Stepan (polyester polyol, hydroxy number: 240 mgKOH/g, functionality: 2); Terol 649 available from Huntsman (polyester polyol with 15% bio-based material and 24% pre-consumer recycled material, hydroxy number: 360 mgKOH/g, functionality: 3); Voranol 360, available from Dow (sucrose-based polyether polyol, hydroxy number: 360 mg KOH/g, functionality: 4.5); Voranol 470X, available from Dow (Mannich polyether polyol, hydroxy number: 470 mg KOH/g, functionality: 3.5); Voranol 490, available from Dow (sucrose/glycerin initiated polyether polyol, hydroxy number: 490 mg KOH/g, functionality: 4.3); Voranol 391, available from Dow (amine (orthodiaminotoluene) initiated polyol, hydroxy number: 395 mg KOH/g, functionality: 4); Voranol 270, available from Dow (glycerine initiated polyether polyol, hydroxy number: 238 mg KOH/g, functionality: 3); Terate HT5510, available from Invista (aromatic polyester polyol, hydroxy number: 260 mg KOH/g, functionality: 2); Poly L-255-28 available from Monument (ethylene oxide-capped polyether diol, hydroxy number: 28 mg KOH/g, functionality: 2); Pluracol 5132 available from BASF (primary hydroxyl-terminated graft polyether triol, hydroxy number: 21 mg KOH/g, functionality: 3); Poly G-85-29 available from Monument (ethylene oxide-capped polyether triol, hydroxy number: 28 mg KOH/g, functionality: 3); NIAX Silicone L-6900 (silicon surfactant from Momentive); Tegostab B84210 (silicon surfactant from Evonik); Niax L5302 (silicon surfactant from Momentive); Vorasurf DC 193 (silicon surfactant from Dow); Dabco K15 (potassium-octoate in diethylene glycol from Evonik); Polycat 8 (N,N-dimethylcyclohexylamine from Evonik); Dabco 33-LV (4-diazabicyclo[2.2.2]octane from Evonik); Polycat 5 (pentamethyldiethylenetriamine from Evonik); Polycat 41 (1,3,5-tris[3-(dimethylamino)propyl]hexahydro-1,3,5-triazine from Evonik); Bicat 8210 (bismuth carboxylate catalyst from Shepherd, Bi content: 28%); Lupranate M20 available from BASF (polymeric isocyanate, 31.5% NCO, functionality: 2.7); Rubinate 1209 available from Huntsman (low functionality prepolymer isocyanate, 21.5% NCO, functionality: 2.12); TCPP (Tris (1-chloro-2-propyl) phosphate) phosphorus content: 9.4 wt. %; chlorine content: 33 wt. %.

The foam was formulated by hand mixing based on the formulations described in the Examples below. The lambda value was recorded using the LaserComp FOX50 with a sample size of 12"×12"×1".

Example 1: Ebulliometer Study on Z-chloro-2,3,3,3-tetrafluoropentene (HCFO-1224yd(Z)) and Water An ebulliometer was used to measure the azeotrope of Z-1-chloro-2,3,3,3-tetrafluoropropene (HCFO-1224yd(Z)) and water. The ebulliometer consisted of a vacuum jacketed glass vessel which is sealed at the bottom and open to the atmosphere at the top. The top or condenser portion of the ebulliometer was surrounded by mixture of dry ice and ethanol to ensure that all vapors are condensed and passed back into the ebulliometer. A Quartz thermometer was used to record the temperature of the condensed liquid. About 15.21 g of Z-1-chloro-2,3,3,3-tetrafluoropropene (HCFO-1224yd(Z)) were charged to the ebulliometer and water was added in small, measured increments. Temperature depression was observed when water was added to Z-1-chloro-2,3,3,3-tetrafluoropropene (HCFO-1224yd(Z)), indicating a binary minimum boiling azeotrope was formed.

As shown below in Table 1, the boiling point temperature of the mixture reached a minimum value and then flattened indicating the formation of a heterogeneous azeotrope. More specifically, the composition comprising about 58.1 wt. % to about 99.7 wt. % Z-1-chloro-2,3,3,3-tetrafluoropropene (HCFO-1224yd(Z)) had a change in boiling point of less than 0.42° C. at 14.51 psia.

TABLE 1

| Temperature (° C.) | HCFO-1224yd (Z) wt. % | Water wt. % |
|---|---|---|
| 14.33 | 100.00 | 0.00 |
| 14.22 | 99.74 | 0.26 |
| 14.02 | 98.96 | 1.04 |
| 14.02 | 97.63 | 2.37 |
| 14.00 | 96.39 | 3.61 |
| 13.99 | 94.53 | 5.47 |
| 13.98 | 92.18 | 7.82 |
| 13.98 | 89.95 | 10.05 |
| 13.98 | 87.41 | 12.59 |
| 13.97 | 84.92 | 15.08 |
| 13.97 | 82.17 | 17.83 |
| 13.96 | 79.51 | 20.49 |
| 13.95 | 76.70 | 23.30 |
| 13.94 | 74.09 | 25.91 |
| 13.93 | 71.27 | 28.73 |
| 13.93 | 68.36 | 31.64 |
| 13.92 | 65.70 | 34.30 |
| 13.92 | 62.90 | 37.10 |
| 13.92 | 60.41 | 39.59 |
| 13.91 | 58.08 | 41.92 |
| 13.92 | 53.86 | 46.14 |
| 13.92 | 51.96 | 48.04 |
| 13.92 | 50.18 | 49.82 |
| 13.93 | 48.58 | 51.42 |
| 13.94 | 47.00 | 53.00 |

Figure 1:
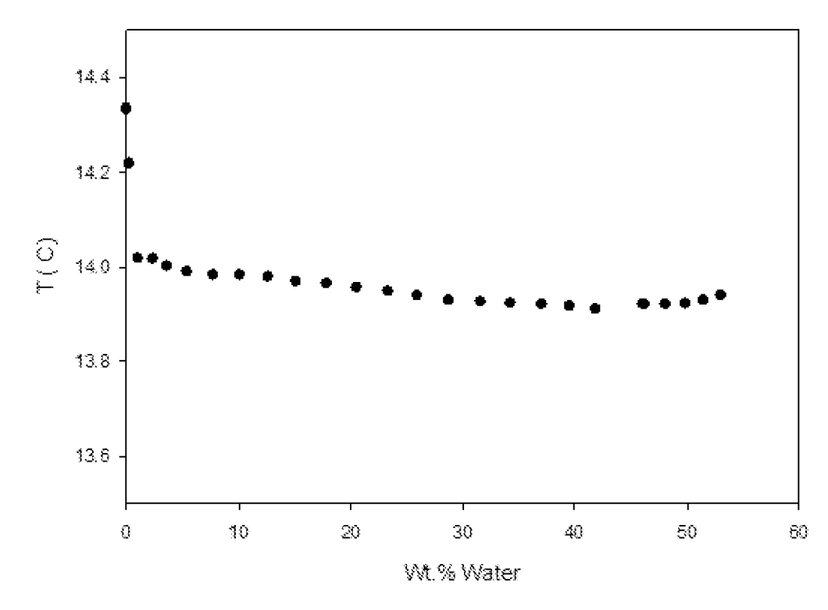
FIG. 1 shows the boiling point of a mixture of Z-1-chloro-2,3,3,3-tetrafluoropropene (HCFO-1224yd(Z)) and water versus the weight percent of water in the mixture as described in Example 1.

These results are presented in graphic form in FIG. 1.

Example 2: Z-1-chloro-2,3,3,3-tetrafluoropropene (HCFO-1224yd(Z)) and Water in Polyisocyanurate Foam A Z-1-chloro-2,3,3,3-tetrafluoropropene (HCFO-1224yd (Z)) and water blend comprising 97.92 wt. % Z-1-chloro-2,3,3,3-tetrafluoropropene (HCFO-1224yd(Z)) as calculated by dividing the 37.57 parts of Z-1-chloro-2,3,3,3-tetrafluoropropene (HCFO-1224yd(Z)) shown in Table 2 by the 38.37 total parts of the blend and 2.08 wt. % water as calculated by dividing the 0.8 parts water shown in Table 2 by the 38.37 total parts of the blend was used as a blowing agent in the formulation of a polyisocyanurate foam. The foam obtained displayed a lower lambda value, lower aged lambda, and smaller change in lambda than a comparable mixture using E-1-chloro-3,3,3-trifluoropropene (HFO-1233zd(E)) and water. The foam formulation in its entirety is shown below in Table 2, wherein the components are shown in parts per hundred parts of polyol (phpp).

TABLE 2

| Starting Material | phpp | |
|---|---|---|
| Composition | | |
| Stepanpol PS 2352 | 100 | 100 |
| Niax L6900 | 2 | 2 |
| Dabco K15 | 2 | 2 |
| Polycat 8 | 0.8 | 0.8 |
| Polycat 5 | 0.5 | 0.5 |
| Water | 0.8 | 0.8 |
| TCPP | 15 | 15 |
| HFO-1233zd (E) | 33.00 | |
| HCFO-1224yd (Z) | | 37.57 |
| Lupranate M20 | 173 | 173 |
| Characteristics | | |
| Density (pcf) | 2.30 | 2.32 |
| Initial lambda (mW/mK, 10° C.) | 17.69 | 17.24 |
| Aged 21 days at 70° C. lambda (mW/mK, 10° C.) | 22.98 | 21.78 |
| Change in lambda (mW/mK, 10° C.) | 5.29 | 4.54 |

Example 3: Z-1-chloro-2,3,3,3-tetrafluoropropene (HCFO-1224yd(Z)) and Water in a Spray Foam A Z-1-chloro-2,3,3,3-tetrafluoropropene (HCFO-1224yd (Z)) and water blend comprising 85.07 wt. % Z-1-chloro-2,3,3,3-tetrafluoropropene (HCFO-1224yd(Z)) as calculated by dividing the 11.4 parts of Z-1-chloro-2,3,3,3-tetrafluoropropene (HCFO-1224yd(Z)) shown in Table 3 by the 13.4 total parts of the blend and 14.93 wt. % water as calculated by dividing the 2 parts water shown in Table 3 by the 13.4 total parts of the blend was used as a blowing agent in a spray formulation. The formulation for the polyol resin in its entirety is shown below, in Table 3, wherein the components are shown in parts per hundred parts of polyol (phpp). This polyol resin was reacted with an equal weight of Lupranate M20 to produce a polyurethane foam.

TABLE 3

| Starting Material | phpp | |
|---|---|---|
| Composition | | |
| Terol 649 | 45 | 45 |
| Voranol 470X | 40 | 40 |
| Voranol 360 | 15 | 15 |
| TCPP | 10 | 10 |
| Dabco 33LV | 2 | 2 |
| Polycat 5 | 0.5 | 0.5 |
| DC193 | 1.5 | 1.5 |
| Water | 2 | 2 |
| HCFO-1224yd (Z) | 11.4 | |
| HFO-1233zd (E) | | 10 |
| Characteristics | | |
| Density (pcf) | 2.53 | 2.52 |
| k-factor (BTU in/ft$^2$ h° F.) | | |
| 50° F. | 0.1366 | 0.1432 |
| 75° F. | 0.1471 | 0.1535 |

Example 4: Z-1-chloro-2,3,3,3-tetrafluoropropene (HCFO-1224yd(Z)) and Water in Appliance Foam A Z-1-chloro-2,3,3,3-tetrafluoropropene (HCFO-1224yd (Z)) and water blend comprising 95.15 wt. % Z-1-chloro-2,3,3,3-tetrafluoropropene (HCFO-1224yd(Z)) as calculated by dividing the 35.3 parts of Z-1-chloro-2,3,3,3-tetrafluoropropene (HCFO-1224yd(Z)) shown in Table 4 by the 37.1 total parts of the blend and 4.85 wt. % water as calculated by dividing the 1.8 parts water shown in Table 4 by the 37.1 total parts of the blend was used as a blowing agent in an appliance formulation. The formulation in its entirety is shown below in Table 4, wherein the components are shown in parts per hundred parts of polyol (phpp).

TABLE 4

| Starting Material | phpp | |
|---|---|---|
| Composition | | |
| Voranol 490 | 32 | 32 |
| Voranol 391 | 40 | 40 |
| Voranol 270 | 8 | 8 |
| Terate HT5510 | 20 | 20 |
| Tegostab B84210 | 4 | 4 |
| Polycat 5 | 0.5 | 0.5 |
| Polycat 8 | 0.8 | 0.8 |
| Polycat 41 | 0.8 | 0.8 |
| Water | 1.8 | 1.8 |
| HCFO-1224yd (Z) | | 35.3 |
| HFO-1233zd (E) | 31 | |
| Lupranate M20 | 124.7 | 124.7 |
| Characteristics | | |
| Density (pcf) | 1.85 | 1.84 |
| Initial lambda (mW/mK, 10° C.) | 18.64 | 18.67 |

Example 5: Z-1-chloro-2,3,3,3-tetrafluoropropene (HCFO-1224yd(Z)) and Water in Integral Skin Foam A Z-1-chloro-2,3,3,3-tetrafluoropropene (HCFO-1224yd (Z)) and water blend comprising 97.14 wt. % Z-1-chloro-2,3,3,3-tetrafluoropropene (HCFO-1224yd(Z)) as calculated by dividing the 6.8 parts of Z-1-chloro-2,3,3,3-tetrafluoropropene (HCFO-1224yd(Z)) shown in Table 5 by the 7 total parts of the blend and 2.86 wt. % water as calculated by dividing the 0.2 parts water shown in Table 5 by the 7 total parts of the blend was used in an integral skin foam formulation. The formulation in its entirety is shown below in Table 5, wherein the components are shown in parts per hundred parts of polyol (phpp).

TABLE 5

| Starting Material | phpp | |
|---|---|---|
| Poly L-255-28 | 60 | 60 |
| Pluracol 5132 | 20 | 20 |
| Poly G-85-29 | 20 | 20 |
| Niax L5302 | 0.3 | 0.3 |
| 1,4-butanediol | 10 | 10 |
| Bloat 8210 | 0.05 | 0.05 |
| Dabco 33LV | 0.5 | 0.5 |
| Water | 0.2 | 0.2 |
| HCFO-1224yd (Z) | | 6.8 |
| HFO-1233zd (E) | 6 | |
| Rubinate 1209 | 55.2 | 55.2 |

Example 6: Foamable Composition Comprising Z-1-chloro-2,3,3,3-tetrafluoropropene (HCFO-1224yd(Z)) and Water A Z-1-chloro-2,3,3,3-tetrafluoropropene (HCFO-1224yd (Z)) and water blend comprising 84.6 wt. % Z-1-chloro-2,3,3,3-tetrafluoropropene (HCFO-1224yd(Z)) as calculated by dividing the 14.8 parts of Z-1-chloro-2,3,3,3-tetrafluoropropene (HCFO-1224yd(Z)) shown in Table 6 by the 17.5 total parts of the blend and 15.4 wt. % water as calculated by dividing the 2.7 parts water shown in Table 6 by the 17.5 total parts of the blend was produced. The formulation in its entirety is shown below in Table 6, wherein the components are shown in parts per hundred parts of polyol (phpp). This polyol resin was reacted with an equal weight of Lupranate M20 to produce a polyurethane foam.

TABLE 6

| Starting Material | phpp |
|---|---|
| Terol 1465 | 60 |
| Voranol 470X | 30 |
| Voranol 360 | 10 |
| DC 193 | 1.5 |
| Dabco 2040 | 5 |
| PC 218 | 0.5 |
| Bicat 8210 | 0.1 |
| Dabco K15 | 1 |
| SAYTEX PURshield | 12 |
| Water | 2.7 |
| HCFO-1224yd (Z) | 14.8 |

The properties of the polyurethane foam are shown below in Table 7.

TABLE 7

| Characteristics | |
|---|---|
| Density (pcf) | 2.06 |
| k-factor (BTU in/ft$^2$ h° F.) | |
| 50° F. | 0.1461 |
| 75° F. | 0.1775 |

Example 7: Foamable Composition Comprising Z-1-chloro-2,3,3,3-tetrafluoropropene (HCFO-1224yd(Z)) and Water A Z-1-chloro-2,3,3,3-tetrafluoropropene (HCFO-1224yd (Z)) and water blend comprising 75.8 wt. % Z-1-chloro-2,3,3,3-tetrafluoropropene (HCFO-1224yd(Z)) as calculated by dividing the 10 parts of Z-1-chloro-2,3,3,3-tetrafluoropropene (HCFO-1224yd(Z)) shown in Table 8 by the 13.2 total parts of the blend and 24.2 wt. % water as calculated by dividing the 3.2 parts water shown in Table 8 by the 13.2 total parts of the blend is produced. The formulation in its entirety is shown below in Table 8, wherein the components are shown in parts per hundred parts of polyol (phpp). This polyol resin is reacted with an equal weight of Lupranate M20 to produce a polyurethane foam.

TABLE 8

| Starting Material | phpp |
|---|---|
| Terol 1465 | 60 |
| Voranol 470X | 30 |
| Voranol 360 | 10 |
| DC 193 | 1.5 |
| Dabco 2040 | 5 |
| PC 218 | 0.5 |
| Bicat 8210 | 0.1 |
| Dabco K15 | 1 |
| SAYTEX PURshield | 12 |
| Water | 3.2 |
| HCFO-1224yd (Z) | 10 |

ASPECTS

Aspect 1 is a composition comprising a heterogeneous azeotrope or azeotrope-like composition consisting essentially of effective amounts of Z-1-chloro-2,3,3,3-tetrafluoropropene (HCFO-1224yd(Z)) and water.

Aspect 2 is the composition of Aspect 1, wherein the azeotrope or azeotrope-like composition has a boiling point between about 13.0° C. and about 14.0° C. at a pressure of between about 14.0 psia and about 15.0 psia.

Aspect 3 is the composition of Aspect 1 or Aspect 2, wherein the azeotrope or azeotrope-like composition consists essentially of from about 47.0 wt. % to about 99.7 wt. % Z-1-chloro-2,3,3,3-tetrafluoropropene (HCFO-1224yd (Z)) and from about 0.3 wt. % to about 53.0 wt. % water.

Aspect 4 is the composition of any of Aspects 1-3, wherein the azeotrope or azeotrope-like composition consists essentially of from about 70 wt. % to about 99 wt. % Z-1-chloro-2,3,3,3-tetrafluoropropene (HCFO-1224yd(Z)) and from about 1 wt. % to about 30 wt. % water.

Aspect 5 is the composition of any of Aspects 1-4, wherein the azeotrope or azeotrope-like composition consists essentially of from about 75 wt. % to about 98.5 wt. % Z-1-chloro-2,3,3,3-tetrafluoropropene (HCFO-1224yd(Z)) and from about 1.5 wt. % to about 25 wt. % water.

Aspect 6 is a method of forming a heterogeneous azeotrope or azeotrope-like composition comprising the step of combining Z-1-chloro-2,3,3,3-tetrafluoropropene (HCFO-1224yd(Z)) and water to form an azeotrope or azeotrope-like composition consisting essentially of effective amounts of Z-1-chloro-2,3,3,3-tetrafluoropropene (HCFO-1224yd(Z)) and water and having a boiling point between about 13.0° C. and about 14.0° C. at a pressure of between about 14.0 psia and about 15.0 psia.

Aspect 7 is the method of Aspect 6, wherein the combining step comprises combining from about 47.0 wt. % to about 99.7 wt. % Z-1-chloro-2,3,3,3-tetrafluoropropene (HCFO-1224yd(Z)) and from about 0.3 wt. % to about 53.0 wt. % water.

Aspect 8 is the method of either Aspect 6 or Aspect 7, wherein the combining step comprises combining from about 70 wt. % to about 99 wt. % Z-1-chloro-2,3,3,3-tetrafluoropropene (HCFO-1224yd(Z)) and from about 1 wt. % to about 30 wt. % water.

Aspect 9 is the method of any of Aspects 6-8, wherein the combining step comprises combining from about 75 wt. % to about 98.5 wt. % Z-1-chloro-2,3,3,3-tetrafluoropropene (HCFO-1224yd(Z)) and from about 1.5 wt. % to about 25 wt. % water Aspect 10 is a blowing agent composition comprising: an azeotrope or azeotrope-like composition of Z-1-chloro-2,3,3,3-tetrafluoropropene (HCFO-1224yd(Z)) and water.

Aspect 11 is the blowing agent composition of Aspect 10, wherein the azeotrope of azeotrope-like composition comprises about 70.0 wt. % to about 99.0 wt. % Z-1-chloro-2,3,3,3-tetrafluoropropene (HCFO-1224yd(Z)) and from about 1.0 wt. % to about 30.0 wt. % water.

Aspect 12 is the blowing agent composition of either Aspect 10 or Aspect 11, wherein the azeotrope of azeotrope-like composition comprises about 75.0 wt. % to about 98.5 wt. % Z-1-chloro-2,3,3,3-tetrafluoropropene (HCFO-1224yd(Z)) and from about 1.5 wt. % to about 25.0 wt. % water.

Aspect 13 is a foamable composition comprising: a foam forming agent; and the blowing agent composition of any of Aspects 10-12.

Aspect 14 is the foamable composition of Aspect 13, wherein the foam forming agent comprises at least one of a polyurethane foam and a polyisocyanurate foam.

Aspect 15 is the foamable composition of either Aspect 13 or Aspect 14, further comprising at least one surfactant.

Aspect 16 is the foamable composition of any of Aspects 13-15, further comprising at least one catalyst.

Aspect 17 is the foamable composition of any of Aspects 13-16, further comprising at least one flammability suppressant.

Aspect 18 is the foamable composition of any of Aspects 13-17, further comprising at least one adjuvant selected from the group consisting of: polymer modifier(s), toughening agent(s), colorant(s), dye(s), solubility enhancer(s), rheology modifier(s), plasticizing agent(s), antibacterial agent(s), viscosity reduction modifier(s), filler(s), vapor pressure modifier(s), and combination of any two or more of these.

Aspect 19 is the composition of Aspect 1 or Aspect 2, wherein the azeotrope or azeotrope-like composition consists essentially of from about 75.0 wt. % to about 99.0 wt. % Z-1-chloro-2,3,3,3-tetrafluoropropene (HCFO-1224yd (Z)) and from about 1.0 wt. % to about 25.0 wt. % water.

Aspect 20 is the composition any of Aspects 1, 2, or 19, wherein the azeotrope or azeotrope-like composition consists essentially of from about 80.0 wt. % to about 99.0 wt. % Z-1-chloro-2,3,3,3-tetrafluoropropene (HCFO-1224yd (Z)) and from about 1.0 wt. % to about 20.0 wt. % water.

Aspect 21 is the composition of any of Aspects 1, 2, 19, or 20, wherein the azeotrope or azeotrope-like composition consists essentially of from about 85.0 wt. % to about 99.0 wt. % Z-1-chloro-2,3,3,3-tetrafluoropropene (HCFO-1224yd(Z)) and from about 1.0 wt. % to about 15.0 wt. % water.

Aspect 22 is the composition of any of Aspects 1, 2, or 19-21, wherein the azeotrope or azeotrope-like composition consists essentially of from about 90.0 wt. % to about 99.0 wt. % Z-1-chloro-2,3,3,3-tetrafluoropropene (HCFO-1224yd(Z)) and from about 1.0 wt. % to about 10.0 wt. % water Aspect 23 is the composition of any of Aspects 1, 2, or 19-22, wherein the azeotrope or azeotrope-like composition consists essentially of from about 95.0 wt. % to about 99.0 wt. % Z-1-chloro-2,3,3,3-tetrafluoropropene (HCFO-1224yd(Z)) and from about 1.0 wt. % to about 5.0 wt. % water.

Aspect 24 is the method of Aspect 6, wherein the combining step comprises combining from about 75.0 wt. % to about 99.0 wt. % Z-1-chloro-2,3,3,3-tetrafluoropropene (HCFO-1224yd(Z)) and from about 1.0 wt. % to about 25.0 wt. % water.

Aspect 24 is the method of Aspect 6, wherein the combining step comprises combining from about 75.0 wt. % to about 99.0 wt. % Z-1-chloro-2,3,3,3-tetrafluoropropene (HCFO-1224yd(Z)) and from about 1.0 wt. % to about 25.0 wt. % water.

Aspect 25 is the method of Aspect 6 or Aspect 24, wherein the combining step comprises combining from about 80.0 wt. % to about 99.0 wt. % Z-1-chloro-2,3,3,3-tetrafluoropropene (HCFO-1224yd(Z)) and from about 1.0 wt. % to about 20.0 wt. % water.

Aspect 26 is the method of any of Aspects 6, 24, or 25, wherein the combining step comprises combining from about 85.0 wt. % to about 99.0 wt. % Z-1-chloro-2,3,3,3-tetrafluoropropene (HCFO-1224yd(Z)) and from about 1.0 wt. % to about 15.0 wt. % water.

Aspect 27 is the method of any of Aspects 6 or 24-26, wherein the combining step comprises combining from about 90.0 wt. % to about 99.0 wt. % Z-1-chloro-2,3,3,3-tetrafluoropropene (HCFO-1224yd(Z)) and from about 1.0 wt. % to about 10.0 wt. % water.

Aspect 28 is the method of any of Aspects 6 or 24-27, wherein the combining step comprises combining from about 95.0 wt. % to about 99.0 wt. % Z-1-chloro-2,3,3,3-tetrafluoropropene (HCFO-1224yd(Z)) and from about 1.0 wt. % to about 5.0 wt. % water.

Aspect 29 is the blowing agent composition of Aspect 10, wherein the azeotrope of azeotrope-like composition comprises about 75.0 wt. % to about 99.0 wt. % Z-1-chloro-2, 3,3,3-tetrafluoropropene (HCFO-1224yd(Z)) and from about 1.0 wt. % to about 25.0 wt. % water.

Aspect 30 is the blowing agent composition of either Aspect 10 or Aspect 29, wherein the azeotrope of azeotrope-like composition comprises about 80.0 wt. % to about 99.0 wt. % Z-1-chloro-2,3,3,3-tetrafluoropropene (HCFO-1224yd(Z)) and from about 1.0 wt. % to about 20.0 wt. % water.

Aspect 31 is the blowing agent composition of any of Aspects 10, 29, or 30, wherein the azeotrope of azeotrope-like composition comprises about 85.0 wt. % to about 99.0 wt. % Z-1-chloro-2,3,3,3-tetrafluoropropene (HCFO-1224yd(Z)) and from about 1.0 wt. % to about 15.0 wt. % water.

Aspect 32 is the blowing agent composition of any of Aspects 10 or 29-31, wherein the azeotrope of azeotrope-like composition comprises about 85.0 wt. % to about 99.0 wt. % Z-1-chloro-2,3,3,3-tetrafluoropropene (HCFO-1224yd(Z)) and from about 1.0 wt. % to about 15.0 wt. % water.

Aspect 33 is the blowing agent composition of any of Aspects 10 or 29-32, wherein the azeotrope of azeotrope-like composition comprises about 90.0 wt. % to about 99.0 wt. % Z-1-chloro-2,3,3,3-tetrafluoropropene (HCFO-1224yd(Z)) and from about 1.0 wt. % to about 10.0 wt. % water.

Aspect 34 is the blowing agent composition of any of Aspects 10 or 29-33, wherein the azeotrope of azeotrope-like composition comprises about 95.0 wt. % to about 99.0 wt. % Z-1-chloro-2,3,3,3-tetrafluoropropene (HCFO-1224yd(Z)) and from about 1.0 wt. % to about 5.0 wt. % water.

Aspect 35 is a foamable composition comprising: a foam forming agent; and the blowing agent composition of any of Aspects 10 or 29-34.

Aspect 36 is the foamable composition of Aspect 35, wherein the foam forming agent comprises at least one of a polyurethane foam and a polyisocyanurate foam.

Aspect 37 is the foamable composition of either Aspect 35 or Aspect 36, further comprising at least one surfactant.

Aspect 38 is the foamable composition of any of Aspects 35-37, further comprising at least one catalyst.

Aspect 39 is the foamable composition of any of Aspects 35-38, further comprising at least one flammability suppressant.

Aspect 40 is the foamable composition of any of Aspects 35-39, further comprising at least one adjuvant selected from the group consisting of: polymer modifier(s), toughening agent(s), colorant(s), dye(s), solubility enhancer(s), rheology modifier(s), plasticizing agent(s), antibacterial agent(s), viscosity reduction modifier(s), filler(s), vapor pressure modifier(s), and combination of any two or more of these.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the singular forms "a", "an" and "the" include plural unless the context clearly dictates otherwise. Moreover, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

The invention claimed is:

1. A composition comprising a heterogeneous azeotrope or azeotrope-like composition consisting essentially of effective amounts of Z-1-chloro-2,3,3,3-tetrafluoropropene (HCFO-1224yd(Z)) and water.

2. The composition of claim 1, wherein the azeotrope or azeotrope-like composition has a boiling point between about 13.0° C. and about 14.0° C. at a pressure of between about 14.0 psia and about 15.0 psia.

3. The composition of claim 1, wherein the azeotrope or azeotrope-like composition consists essentially of from about 75.0 wt. % to about 99.0 wt. % Z-1-chloro-2,3,3,3-tetrafluoropropene (HCFO-1224yd(Z)) and from about 1.0 wt. % to about 25.0 wt. % water.

4. The composition of any of claim 1, wherein the azeotrope or azeotrope-like composition consists essentially of from about 80.0 wt. % to about 99 wt. % Z-1-chloro-2,3,3,3-tetrafluoropropene (HCFO-1224yd(Z)) and from about 1.0 wt. % to about 20.0 wt. % water.

5. The composition of any of claim 1, wherein the azeotrope or azeotrope-like composition consists essentially of from about 85.0 wt. % to about 99.0 wt. % Z-1-chloro-2,3,3,3-tetrafluoropropene (HCFO-1224yd(Z)) and from about 1.0 wt. % to about 15.0 wt. % water.

6. A method of forming a heterogeneous azeotrope or azeotrope-like composition comprising the step of contacting Z-1-chloro-2,3,3,3-tetrafluoropropene (HCFO-1224yd(Z)) and water to form an azeotrope or azeotrope-like composition consisting essentially of effective amounts of Z-1-chloro-2,3,3,3-tetrafluoropropene (HCFO-1224yd(Z)) and water and having a boiling point between about 13.0° C. and about 14.0° C. at a pressure of between about 14.0 psia and about 15.0 psia.

7. The method of claim 6, wherein the contacting step comprises combining from about 75.0 wt. % to about 99.0 wt. % Z-1-chloro-2,3,3,3-tetrafluoropropene (HCFO-1224yd(Z)) and from about 1.0 wt. % to about 25.0 wt. % water.

8. The method of claim 6, wherein the contacting step comprises combining from about 80.0 wt. % to about 99.0 wt. % Z-1-chloro-2,3,3,3-tetrafluoropropene (HCFO-1224yd(Z)) and from about 1.0 wt. % to about 20.0 wt. % water.

9. The method of claim 6, wherein the contacting step comprises combining from about 85.0 wt. % to about 99.0 wt. % Z-1-chloro-2,3,3,3-tetrafluoropropene (HCFO-1224yd(Z)) and from about 1.0 wt. % to about 15.0 wt. % water.

10. A blowing agent composition comprising:
an azeotrope or azeotrope-like composition of Z-1-chloro-2,3,3,3-tetrafluoropropene (HCFO-1224yd(Z)) and water.

11. The blowing agent composition of claim 10, wherein the azeotrope of azeotrope-like composition comprises about 75.0 wt. % to about 99.0 wt. % Z-1-chloro-2,3,3,3-tetrafluoropropene (HCFO-1224yd(Z)) and from about 1.0 wt. % to about 25.0 wt. % water.

12. The blowing agent composition of claim 10, wherein the azeotrope of azeotrope-like composition comprises about 80.0 wt. % to about 99.0 wt. % Z-1-chloro-2,3,3,3-tetrafluoropropene (HCFO-1224yd(Z)) and from about 1.0 wt. % to about 20.0 wt. % water.

13. The blowing agent composition of claim 10, wherein the azeotrope of azeotrope-like composition comprises about 85.0 wt. % to about 99.0 wt. % Z-1-chloro-2,3,3,3-tetrafluoropropene (HCFO-1224yd(Z)) and from about 1.0 wt. % to about 15.0 wt. % water.

\* \* \* \* \*